C. A. PARSONS, A. Q. CARNEGIE & S. S. COOK.
GEAR CUTTING MACHINE.
APPLICATION FILED MAR. 2, 1916.

1,274,584.

Patented Aug. 6, 1918.
2 SHEETS—SHEET 1.

Witnesses:

Inventors:
Charles A. Parsons,
Alfred Q. Carnegie, &
Stanley S. Cook.
by
Attorney's C. A. PARSONS, A. Q. CARNEGIE & S. S. COOK.
GEAR CUTTING MACHINE.
APPLICATION FILED MAR. 2, 1916.
1,274,584.
Patented Aug. 6, 1918.
2 SHEETS—SHEET 2.
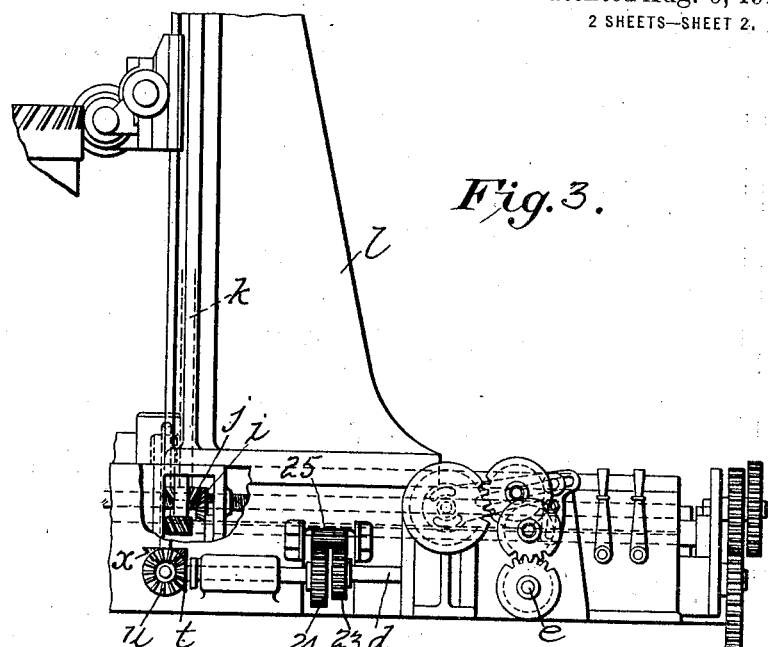
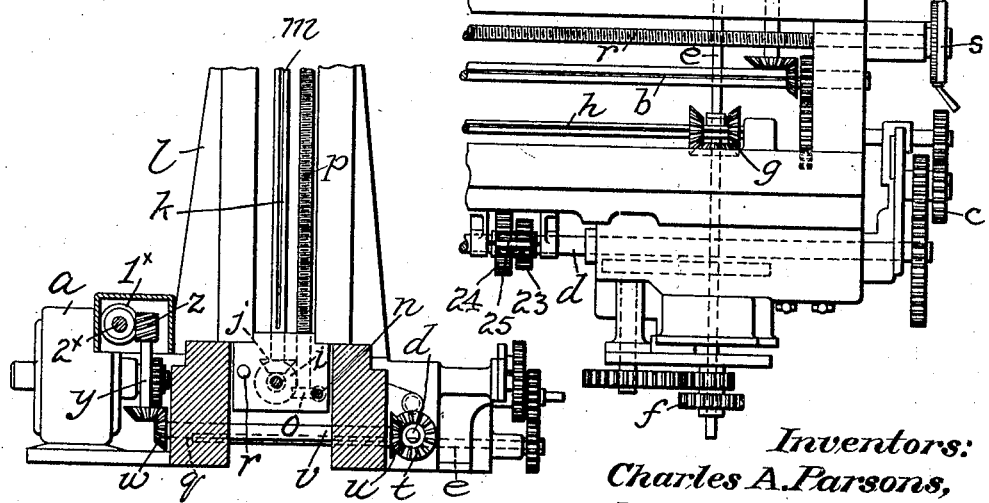
Inventors:
Charles A. Parsons,
Alfred Q. Carnegie,
Stanley S. Cook,
by Spear, Middleton, Donaldson & Spear,
Attys.

UNITED STATES PATENT OFFICE.

CHARLES ALGERNON PARSONS AND ALFRED QUINTIN CARNEGIE, OF NEWCASTLE-UPON-TYNE, AND STANLEY SMITH COOK, OF WALLSEND, ENGLAND; SAID CARNEGIE AND SAID COOK ASSIGNORS TO SAID PARSONS.

GEAR-CUTTING MACHINE.

1,274,584.      Specification of Letters Patent.      Patented Aug. 6, 1918.

Original application filed March 25, 1913, Serial No. 756,762. Divided and this application filed March 2, 1916. Serial No. 81,741.

*To all whom it may concern:*

Be it known that we, the Honorable Sir CHARLES ALGERNON PARSONS, K. C. B., ALFRED QUINTIN CARNEGIE, both subjects of the King of Great Britain and Ireland, and residing at Heaton Works, Newcastle-upon-Tyne, in the county of Northumberland, England, and STANLEY SMITH COOK, a subject of the King of Great Britain and Ireland, and residing at Turbinia Works, Wallsend, in the county of Northumberland, England, have invented certain new and useful Improvements in Gear-Cutting Machines, of which the following is a specification.

This invention relates to methods and means for cutting the teeth in gear wheels, such as is described in Letters Patent granted to us January 8, 1918, #1,252,482.

While the present machines cut the teeth with a high order of accuracy, a still higher degree of accuracy is desirable to insure the silent operation of gear wheels when transmitting large powers at high speeds, and also to minimize the wear of the teeth. It is obvious that with the processes already adopted the accuracy of the finished wheel cannot be greater than that of the parent gear of the machine by which the teeth are cut. Local irregularities in this parent gear cause irregularities in the teeth of the wheels being cut which exactly correspond in angular position with those of the parent gear, and which, when such wheels are in operation for the transmission of power, will give rise to periodic vibrations, often of high frequency, and therefore productive of noise. In the case, for instance, in which the table on which the work is mounted is rotated by means of a worm and a worm wheel, the latter being attached permanently to the table, it will be seen that the irregularities formed on the work are a function of the angular position of the table in relation to the position of the worm. The latter is usually fixed and since the cutter is also usually in a fixed position on the machine, and advances across the work in a direction parallel to the axis of the table, there will result lines of irregularities on the finished wheel lying in planes through the axis of the table, and therefore of the work mounted thereon.

It will be seen that irregularities so positioned will, when the wheel is at work, come into mesh simultaneously across the face of the wheel, thus causing irregularities in the relative rotational motion of the wheel and pinion engaging therewith. If, however, a small amount of rotary motion relative to the table be imparted to the work it will be seen that the irregularities formed in the work will be distributed spirally around the wheel, and that if this relative creep be considerable, these spirals will make a small angle with the plane of revolution of the wheel, and will consequently lie closely to each other, with the result that the pinion and wheel will, when geared together, preserve a constant relative angular velocity between them.

The present invention consists in improved means for distributing the irregularities formed in the work in spirals making a comparatively small angle with the plane of revolution of said work, whereby the periodic correspondence of said irregularities with the irregularities of the parent gear rotating the same is destroyed.

Referring to the accompanying drawings—

Fig. 3 is a view of that portion of the machine which joins Fig. 1 on the right thereof. Fig. 4 is a plan view of that portion of the machine which joins Fig. 2 on the right thereof.

Fig. 5 is a cross sectional view looking from the left of Fig. 3.

Figure 1:
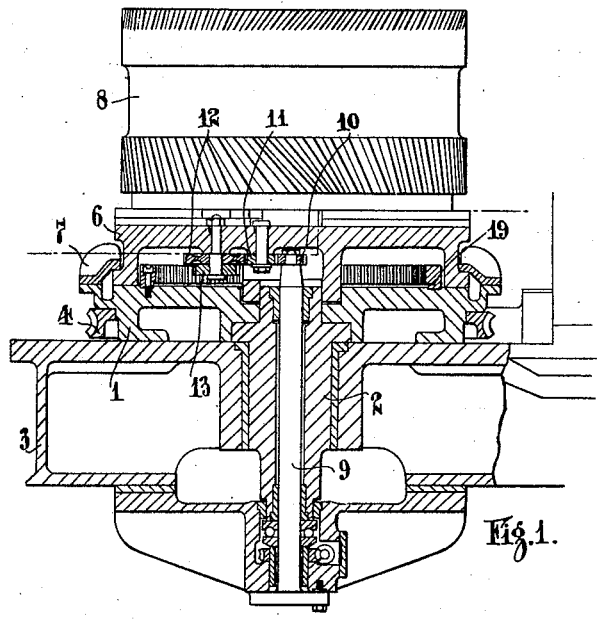
Figure 1 is a cross sectional elevation through the work carrying table and accompanying parts of a gear cutting machine embodying the present invention.
Figure 2:
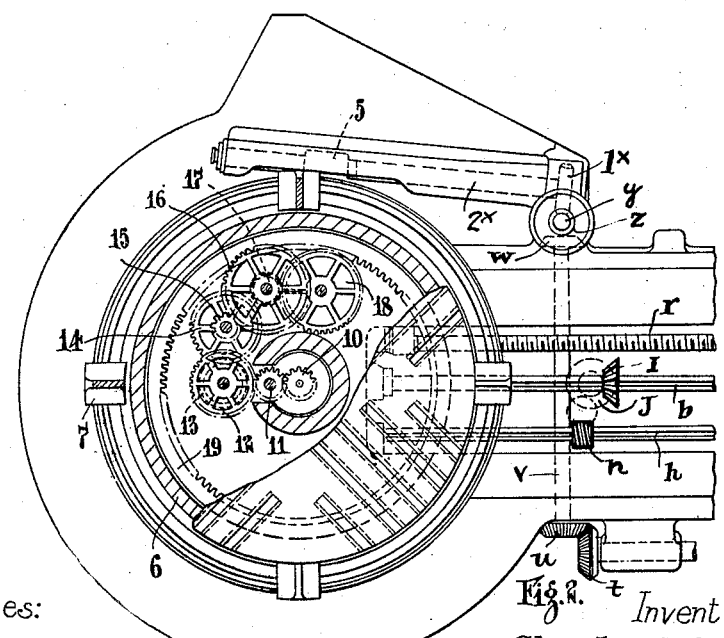
Fig. 2 is a part sectional plan of Fig. 1.

In carrying the invention into effect, according to the present construction, a primary table 1 is provided, constrained to rotate about its axis by a bearing 2, in the bed member 3. Attached to the primary table 1 is an indexing worm wheel 4, with which a driving worm 5 engages.

Upon the primary table 1 a secondary table 6 is rotatably mounted, and is held down to the table 1 by dogs 7.

The work 8 is mounted upon the secondary table 6, in any suitable manner.

The fixed spindle 9 carries a pinion wheel 10, which operates a train of spur wheels and pinions 11, 12, 13, 14, 15, 16, 17 and 18, which are attached to the secondary table 6. The final member 18 of the train engages with a circular rack 19 fixed upon the primary table 1, and from this arrangement of gearing it will be seen that at least one intermediate member of the train is connected with the work carrying table.

It will be seen that the movement of the internal rack will be transmitted through the final member 18 to the train and as the first member of the train meshes with the fixed pinion 10 the whole train will revolve around the said fixed pinion and the secondary table 6 will thus be given a motion relatively to the table 1, the amount of such motion depending upon the proportions adopted in the gearing.

It will be understood that the shaft 20 is driven from any suitable source of power, and is so connected in any well known manner with the hob drive and hob feed mechanism that the proper relations are maintained to produce the required pitch of the teeth cut on the work, and also the helical angle of the teeth when helical teeth are required to be cut.

It will be understood that the indexing worm wheel 4 and its worm constitute the driven and driving members of a parent gear.

Referring to Figs. 3 and 4 which illustrate the connections to the hob device and hob mechanism it is to be noted that these connections may be the same as those described in the Letters Patent above referred to.

The machine is driven by an electric motor $a$, which drives through suitable gearing the spindle $b$, from which motion is transmitted through suitable change speed gearing $c$, to the shaft $d$. Motion is also transmitted from the motor $a$, through the shaft $d$, to a cross shaft and gear wheels $f$, and through a reversing gear $g$, to the spindle $h$. The gear wheels $f$, form a change gear by which the helical angle of the teeth formed on the work is controlled through the usual differential in shaft $d$. The shaft $e$, is a part of a connection for shifting reversing gears at $g$, said shaft being operated by the hand lever $16^x$. The spindle $b$, carries a bevel wheel $i$, gearing with another bevel wheel $j$, mounted on a vertical spindle $k$, mounted in the cutter standard $l$. The vertical spindle $k$, is provided with a feather-way $m$, by which its rotation is transmitted to the cutter. The spindle $h$, is provided with a worm $n$, which engages with a worm wheel $o$, on another vertical spindle $p$, mounted in the cutter standard $l$. This spindle $p$, is threaded, and when rotated causes a vertical up and down movement of the cutter, thus moving the cutter across the face of the work. The cutter standard $l$, is provided with suitable means for being traversed longitudinally on the bed $q$, of the machine, by means of the threaded spindle $r$, which can be rotated by the hand wheel $s$.

The rotation of the shaft $d$, is transmitted direct or through suitable compensating gear as shown at 23, 24, 25, to a bevel wheel $t$, engaging with another bevel wheel $u$, on a horizontal shaft $v$, carrying at its other end another bevel wheel $w$. This engages with yet a further bevel wheel $x$, on a vertical shaft $y$, carrying at its other end a worm $z$, engaging with a worm wheel $1^x$, on a shaft $2^x$, provided with the worm 5.

Having now described our invention, what we claim as new and desire to secure by Letters Patent is:

1. A gear cutting machine comprising in combination a primary table having internal teeth thereon, a parent gear rotating the same having a driving and driven member, said driven member being attached to said primary table, a secondary table mounted rotatably on said primary table, a stationary pinion coaxial with said tables, and a train of toothed wheels mounted upon said secondary table, the first of said toothed wheels engaging the stationary coaxial pinion, the last of said toothed wheels engaging the internal teeth carried by said primary table, whereby the train of gearing is caused to rotate by the motion of the primary table and to rotate the secondary table at a different rate from the primary table, a hob, means to rotate said hob, means between said hob rotating means and said index wheel rotating means to preserve correct indexing relation between the rotations of said hob and the rotations of said secondary table, means to feed said hob, means between said hob feeding means and said index wheel rotating means to preserve correct lead relation between said hob feed and the speed of said work-carrying table.

2. A gear cutting machine comprising in combination a rotatable work-carrying table, an index wheel, means to rotate said index wheel, a gear train, certain of the elements of said train being mounted upon said table, means to position the first member of said train co-axial with said table and stationary relatively thereto, the final member of said train being connected to said index wheel, a hob, means to rotate said hob, means between said hob rotating means and said index wheel rotating means to preserve correct indexing relation between the rotations of said hob and the rotations of said table, means to feed said hob, means between said hob feeding means and said index wheel rotating means to preserve correct lead relation between said hob feed and the speed of said table.

3. A gear cutting machine comprising in combination a rotatable work-carrying table, an index wheel, means to rotate said index wheel, a gear train, means to prevent the rotation of the first member of said train, the final member of said train being connected to said index wheel, and an intermediate member of said train being connected to said table, a hob, means to rotate said hob, means between said hob rotating means and said index wheel rotating means to preserve correct indexing relation between the rotations of said hob and the rotations of said table, means to feed said hob, means between said hob feeding means and said index wheel rotating means to preserve correct lead relation between said hob feed and the speed of said table.

4. A gear cutting machine comprising in combination a work-carrying member adapted to rotate about an axis, an index wheel rotatable about the same axis, means to rotate said index wheel, a gear train of toothed wheels, means to hold the first pinion of said train stationary and co-axial with the axis of said table, means to connect the last wheel of said train to said index wheel and co-axial therewith and means upon said table to rotatably support at least one intermediate wheel of said train, a hob, means to rotate said hob, means between said hob rotating means and said index wheel rotating means to preserve correct indexing relation between the rotations of said hob and the rotations of said table, means to feed said hob, means between said hob feeding means and said indexing wheel rotating means to preserve correct lead relation between said hob feed and the speed of said table.

5. A gear cutting machine comprising in combination a primary table, an index worm-wheel secured to said table, a worm engaging said wheel and acting to rotate the same, a secondary work-carrying table mounted rotatably on and co-axial with said primary table, spindle means carried by said secondary table, toothed gear means mounted on said spindle means, a stationary pinion co-axial with said tables and engaging said toothed gear means, a toothed member secured to said primary table and co-axial therewith, said toothed member engaging said toothed gear means, thereby causing said toothed gear means to rotate by the motion of the primary table and to rotate the secondary table at a different rate from the primary table, a hob, means to rotate said hob, means between said hob rotating means and said index wheel rotating means to preserve correct indexing relation between the rotations of said hob and the rotations of said secondary table, means to feed said hob, means between said hob feeding means and said indexing wheel rotating means to preserve correct lead relation between said hob feed and the speed of said table.

In testimony whereof, we have affixed our signatures.

CHARLES ALGERNON PARSONS.
ALFRED QUINTIN CARNEGIE.
STANLEY SMITH COOK.